(12) United States Patent
Shenk et al.

(10) Patent No.: US 11,716,936 B2
(45) Date of Patent: Aug. 8, 2023

(54) ROUND BALER WITH MOVABLE FOLLOWER ROLLS

(71) Applicant: CNH Industrial America LLC, New Holland, PA (US)

(72) Inventors: Jonathan Shenk, Lititz, PA (US); Enrico Giuliani, Russi (IT)

(73) Assignee: CNH Industrial America LLC, New Holland, PA (US)

( * ) Notice: Subject to any disclaimer, the term of this patent is extended or adjusted under 35 U.S.C. 154(b) by 730 days.

(21) Appl. No.: 16/684,998

(22) Filed: Nov. 15, 2019

(65) Prior Publication Data

US 2021/0144927 A1 May 20, 2021

(51) Int. Cl.
*A01F 15/07* (2006.01)
*A01F 15/18* (2006.01)

(52) U.S. Cl.
CPC .......... *A01F 15/0765* (2013.01); *A01F 15/18* (2013.01); *A01F 2015/077* (2013.01); *A01F 2015/183* (2013.01); *A01F 2015/186* (2013.01)

(58) Field of Classification Search
CPC .................. A01F 15/0765; A01F 15/18; A01F 2015/077; A01F 2015/183; A01F 2015/186; A01F 2015/078; A01F 2015/0795; A01F 2015/07; A01F 2015/0833; A01F 2015/85
See application file for complete search history.

(56) References Cited

U.S. PATENT DOCUMENTS

| | | | |
|---|---|---|---|
| 4,956,968 A * | 9/1990 | Underhill | A01F 15/0715 53/118 |
| 5,020,311 A | 6/1991 | Matthies | |
| 5,913,805 A * | 6/1999 | Vodon | A01F 15/07 100/88 |
| 5,931,089 A * | 8/1999 | Viesselmann | A01F 15/07 100/88 |
| 6,170,245 B1 | 1/2001 | Underhill | |
| 6,843,170 B1 | 1/2005 | Guthmann et al. | |
| 2011/0100236 A1 * | 5/2011 | Viaud | A01F 15/0833 100/88 |

FOREIGN PATENT DOCUMENTS

GB    2 197 250 B    6/1990

* cited by examiner

*Primary Examiner* — Matthew Katcoff
*Assistant Examiner* — Mohammed S. Alawadi
(74) *Attorney, Agent, or Firm* — Peter K. Zacharias

(57) ABSTRACT

A bale chamber of an agricultural round baler. The bale chamber includes a main frame, a plurality of rollers, and at least one belt engaging with at least one roller of the plurality of rollers. The at least one belt and the plurality of rollers are together configured for creating a round circulating chamber. The bale chamber also includes a subframe movably connected to the main frame and at least one follower roller pivotally connected to the subframe at a first pivot axis. The at least one follower roller engages with the at least one belt. The subframe is configured for moving during formation of the bale so that the at least one follower roller moves in between a first position at the empty bale position of the circulating chamber and a second position at the full bale position of the circulating chamber.

9 Claims, 3 Drawing Sheets

ROUND BALER WITH MOVABLE FOLLOWER ROLLS

BACKGROUND OF THE INVENTION

The present invention pertains to agricultural balers and, more specifically, to follower rolls for a round baler.

Agricultural harvesting machines, such as balers, are used to consolidate and package crop material so as to facilitate the storage and handling of the crop material for later use. In the case of hay or silage, a mower-conditioner is typically used to cut and condition the crop material. In the case of straw, an agricultural combine discharges non-grain crop material from the rear of the combine defining the straw (such as wheat or oat straw) which is to be picked up by the baler. The cut crop material is typically raked into a windrow, and a baler, such as a large square baler or round baler, straddles the windrows and travels along the windrows to pick up the crop material and form it into bales.

A round baler may generally include a frame, supported by wheels, a pickup unit to engage and lift the crop material into the bailer, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The bale chamber may also include follower rollers that are pivotally attached to the frame of the baler at a fixed pivot point. The follower rollers are typically a set of two rollers that are located at the front of the bale chamber for engaging with the belts of the bale chamber. The follower rollers help to define the overall shape of the chamber which rolls the bale. In certain operating conditions however, the follower rollers may undesirably affect the formation of the bale. For example, when the bale chamber is empty, the belts may interfere with the other rollers due to the angle at which the belt traverses over the follower rollers. Hence, the belt may become damaged. Also, the operator may be subjected to excessive noise. Furthermore, at certain bale sizes during formation of the bale, there may exist gaps between the outer periphery of the bale and the belt. These periodic gaps may allow crop material to escape therethrough; thus, causing suboptimal bale formation and crop loss. Therefore, the position of the follower rollers may undesirably affect the operation of the baler.

What is needed in the art is an agricultural baler with adjustable follower rollers.

SUMMARY OF THE INVENTION

In one exemplary embodiment formed in accordance with the present invention, there is provided a bale chamber that includes a subframe which is movably connected to the main frame. At least one follower roller is pivotally connected to the subframe at a first pivot axis. The at least one follower roller engages with at least one belt. The subframe is configured for moving during formation of the bale so that the at least one follower roller moves in between a lower, rearward position at the empty bale position of the circulating chamber and an upper, forward position at the full bale position of the circulating chamber.

In another exemplary embodiment formed in accordance with the present invention, there is provided a bale chamber of an agricultural round baler. The bale chamber includes a main frame, a plurality of rollers supported by the main frame, and at least one belt engaging with at least one roller of the plurality of rollers. The at least one belt and the plurality of rollers are together configured for creating a round circulating chamber which expands in between an empty bale position and a full bale position for engaging and rolling a bale. The bale chamber also includes a subframe movably connected to the main frame and at least one follower roller pivotally connected to the subframe at a first pivot axis. The at least one follower roller engages with the at least one belt. The subframe is configured for moving during formation of the bale so that the at least one follower roller moves in between a first position at the empty bale position of the circulating chamber and a second position at the full bale position of the circulating chamber.

In yet another exemplary embodiment formed in accordance with the present invention, there is provided an agricultural round baler that includes a pickup unit configured for picking up a crop material from a field and a bale chamber configured for receiving the crop material from the pickup unit. The bale chamber includes a main frame, a plurality of rollers supported by the main frame, and at least one belt engaging with at least one roller of the plurality of rollers. The at least one belt and the plurality of rollers are together configured for creating a round circulating chamber which expands in between an empty bale position and a full bale position for engaging and rolling a bale. The bale chamber also includes a subframe movably connected to the main frame and at least one follower roller pivotally connected to the subframe at a first pivot axis. The at least one follower roller engages with the at least one belt. The subframe is configured for moving during formation of the bale so that the at least one follower roller moves in between a first position at the empty bale position of the circulating chamber and a second position at the full bale position of the circulating chamber.

In yet another exemplary embodiment formed in accordance with the present invention, there is provided a method of operating an agricultural round baler. The method includes an initial step of providing a bale chamber for the agricultural round baler. The bale chamber includes a main frame, a plurality of rollers supported by the main frame, and at least one belt engaging with at least one roller of the plurality of rollers. The at least one belt and the plurality of rollers are together configured for creating a round circulating chamber which expands in between an empty bale position and a full bale position for engaging and rolling a bale. The bale chamber further includes a subframe movably connected to the main frame and at least one follower roller pivotally connected to the subframe at a first pivot axis. The at least one follower roller engages with the at least one belt. The method further includes the steps of rolling the bale within the circulating chamber and moving the subframe during formation of the bale so that the at least one follower roller moves in between a first position at the empty bale position of the circulating chamber and a second position at the full bale position of the circulating chamber.

One possible advantage of the exemplary embodiment of the agricultural round baler is that the movable follower rollers move forwardly and rearwardly to eliminate interference between the various belts and neighboring rollers and further allow proper tangency to the surface of the bale as it grows during formation thereof.

Another possible advantage of the exemplary embodiment of the agricultural round baler is that the movable follower rollers automatically move in response to belt tension.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
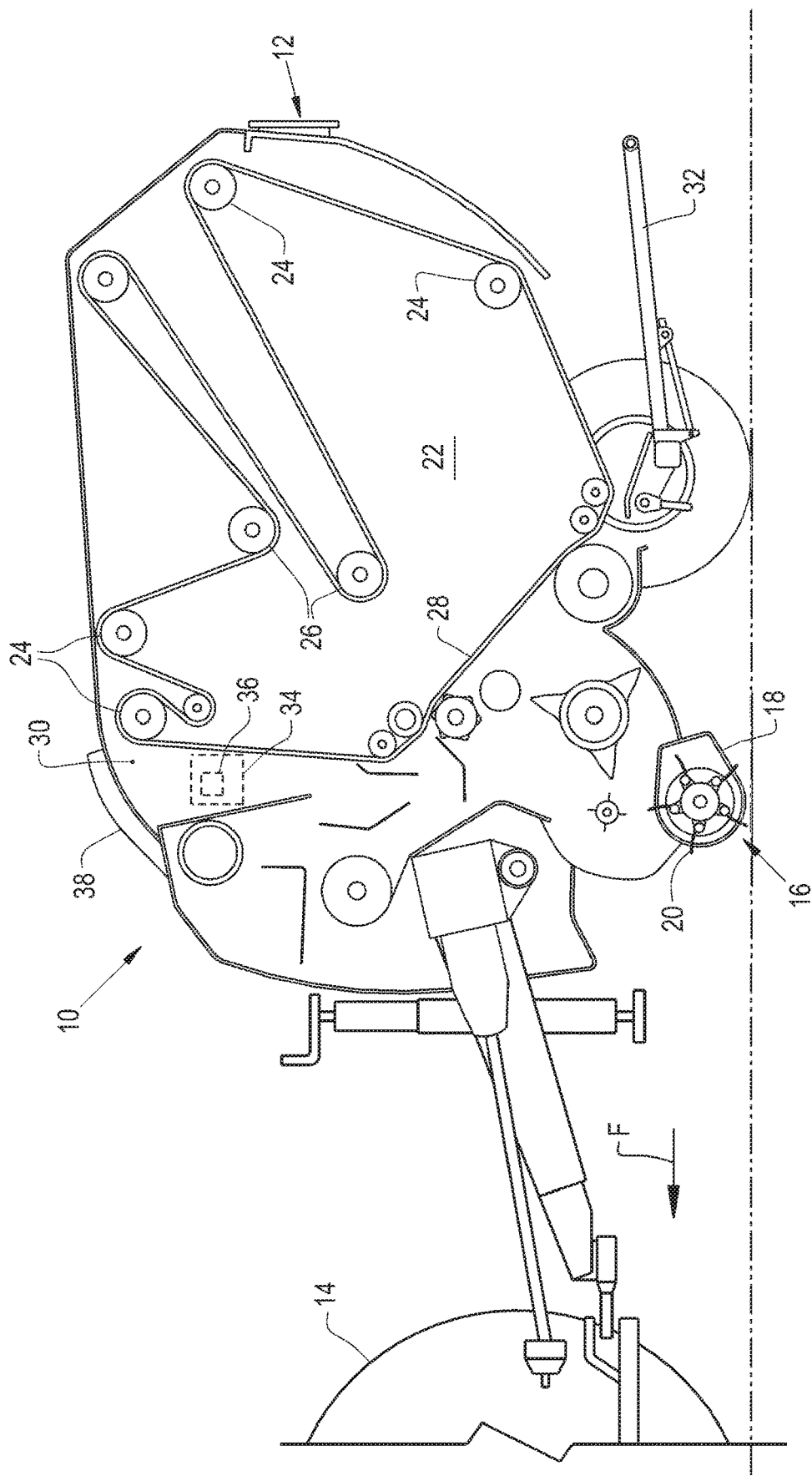
FIG. 1 illustrates a cross-sectional side view of an agricultural baler that has a bale chamber, in accordance with an exemplary embodiment of the present invention.

Referring now to the drawings, and more particularly to FIG. 1, there is shown a cross-sectional, side view of a round baler 10 which may be towed by an agricultural vehicle 14, such as a tractor 14, in a forward direction of travel F. Alternatively, the round baler 10 may be a self-propelled baler.

Crop material is lifted from windrows into the baler 10 by a pickup unit 16. The pickup unit 16 includes a rotating pickup reel 18 with tine bars and tines 20, which move the crop rearward toward a variable bale chamber 22. The reel 18 is rotatable in an operating direction for lifting the crop material off of the ground and a reverse direction, i.e., opposite to the operating direction. In general, the crop material is rolled into a bale of a predetermined size within the variable bale chamber 22, and then is discharged through a tail gate 12 onto the field, where it is subsequently picked up for transport.

The bale chamber 22 is configured as a variable bale chamber 22 which includes multiple rolls or rollers 24, 26, such as various stationary rollers 24 and movable rollers 26, actuators and pivot arms coupled to the movable rollers 26 (not shown), and at least one belt 28. The rollers 24, 26 may comprise a floor roller, starter roller, fixed roller(s), pivot roller(s), stripper roller, and/or follower roller(s). Together, the rollers 24, 26 and the belt(s) 28 create a round circulating chamber which expands in between an empty bale position and a full bale position for engaging and rolling the bale. As the bale grows inside the chamber 22 it begins to act upon the belts 28 such that the belts 28 pull against the pivot arms which in turn causes the movable rollers 26 to move upwardly so that the variable bale chamber 22 incrementally expands with the size of the bale.

When the bale reaches a predetermined size, the bale is wrapped with a wrapping material (e.g., mesh or twine); and then, the bale is ejected out of the tailgate 12. The tailgate 12 may pivot upwardly about pivot axis 30 to open the bale chamber 22. Then, the bale rolls out of the bale chamber 22 and onto a bale ejector or kicker 32, which pushes the bale rearwardly away from the baler so that the tailgate 12 may downwardly pivot unencumbered by the bale.

The agricultural baler 10 can further include an electrical processing circuit 34, e.g. controller 34 with a memory 36, for conducting various baling procedures. For instance, the electrical processing circuit 34 can be configured for carrying out a bale discharge operation. The electrical processing circuit 34 may open the tail gate 12 via accompanying actuators upon sensing a full bale condition by a bale-size sensor (not shown).

Figure 2:
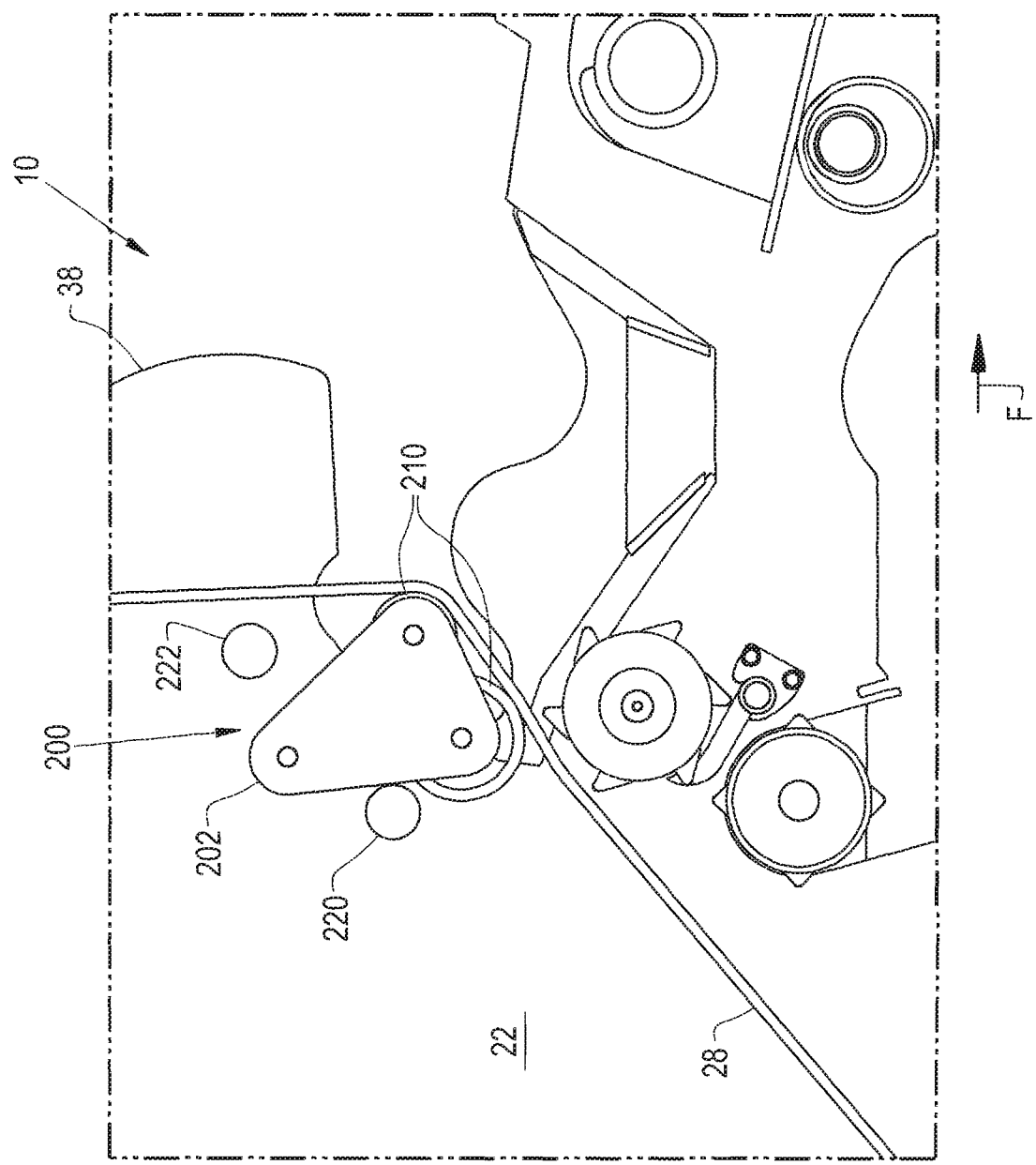
FIG. 2 illustrates a cross-sectional side view of the bale chamber of FIG. 1, wherein the bale chamber is in an empty bale condition.
Figure 3:
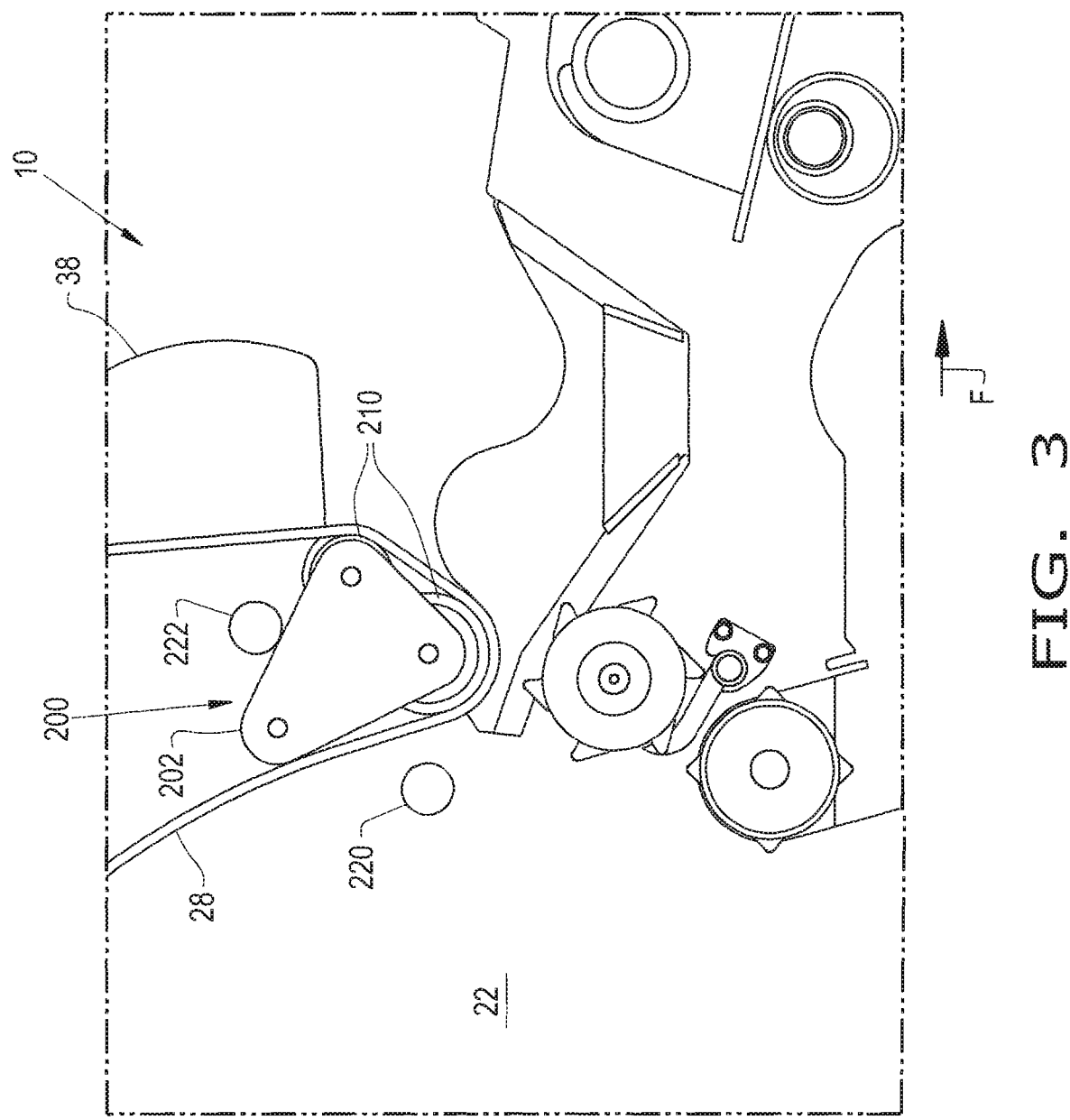
FIG. 3 illustrates a cross-sectional side view of the bale chamber of FIGS. 1-2, wherein the bale chamber is in a full bale condition.

Referring now collectively to FIGS. 1-3, there is shown a subframe 200 for movably mounting at least one follower roller 210 relative to the subframe 200. During formation of the bale, the subframe 200 is configured to move the follower roller(s) 210 in between a rearward position at the empty bale position of the circulating chamber (FIG. 2) and a forward position at the full bale position of the circulating chamber (FIG. 3). The subframe 200 may also include a pair of mechanical stops 220, 222 for limiting the movement of the follower roller(s) 210.

The subframe 200 is movably connected to a main frame 38 of the baler 10. For example, the subframe 200 can be pivotally and/or slidably connected to the main frame 38 so that the subframe is capable of moving vertically up and down and/or horizontally forwardly and rearwardly. As illustrated, the subframe 200 is pivotally connected to the main frame 38 at a pivot axis. The subframe 200 can be a free-floating subframe 200 such that the tension within the belt(s) 28, throughout formation of the bale, controls and pivots the subframe 200. In this regard, the subframe 200 is not independently movable but is passively controlled via tension. Additionally or alternatively, the bale chamber 22 may include an actuator, such as an electric or hydraulic motor and/or cylinder, for pivoting and/or sliding the subframe 200. The subframe 200 may comprise any desired material, such as metal. The actuator may be operably connected to and controlled by the electrical processing circuit 34.

The subframe 200 can be composed of a pair of left and right mounting plates 202 which are each pivotally connected a respective lateral side of the main frame 38. The subframe 200 may include a respective boss on each side of the main frame 38 in order to pivotally attach the mounting plates 202 onto the main frame 38. However, the subframe 200 may be variously configured in any desired manner in order to move, e.g. pivot and/or slide, the one or more following rollers 210 as desired. The mounting plates 202 can have any desired shape and size. For example, the mounting plates 202 can have a triangular cross-section with a top portion that is pivotally connected to the main frame 38, defining the pivot axis of the subframe 200, and a base portion which pivotally mounts one or more follower rollers 210 at a respective pivot axis. In this regard, the pivot axis at the top portion of each mounting plate 202 strategically allows the resulting force vectors, caused by the tension in the belt(s) 28 acting on the follower roller(s) 210 on the bottom portion of each mounting plate 202, to move the follower roller(s) 210 in between the rearward and forward positions thereof. More specifically, when a resultant force vector moves beyond the position of the pivot axis at the top portion of the mounting plate 202, the whole subframe 200 and follower roller(s) 210 attached thereto will pivot in line with the direction of the resultant force vector.

Each follower roller 210 is pivotally connected to the subframe 200 at a respective pivot axis so that each follower roller 210 may rotate relative to the subframe 200 and accordingly engage with the belt(s) 28. The bale chamber 22 may include two follower rollers 210 which are respectively pivotally connected to the base portion of each mounting plate 202 of the subframe 200. The follower rollers 210 can respectively be in the form of any desired follower roller. For instance, one follower roller 210 may have a smaller diameter than the other follower roller 210.

The machinal stops 220, 222 are configured for contacting and limiting the movement, i.e., defining the bounds, of the mounting plates 202 of the subframe 200. The first, rearward mechanical stop 220 is connected to the main frame 38 and is located rearwardly of the subframe 200. The second, forward mechanical stop 222 is connected to the main frame 38 and is located forwardly of the subframe 200. The bale chamber 22 may include only two mechanical stops 220, 222 for one side of the main frame 38 or a total of four mechanical stops 220, 222 respectively located on each side of the main frame 38. The mechanical stops 220, 222 can be fixedly and/or removably connected to the main frame 38. For instance, the mechanical stops 220, 222 can be welded or bolted onto the main frame 38. The mechanical stops 220, 222 may also be adjustably mounted in indexed positions on the main frame 38, relative to the subframe 200, so that the rearward and forward limits of the mounting plates 202 of the subframe 200 can be adjusted. The mechanical stops 220, 222 can be in the form of any desired members for contacting and limiting the movement of the subframe 200. For instance, the mechanical stops 220, 222 can be in the form of rods which only partially extend inwardly toward the center of the bale chamber 22 such that the mechanical stops 220, 222 interrupt the motion of the subframe 200 but do not undesirably interfere with the formation of the bale. However, the mechanical stops 222, 220 can have any desired shape and size and may comprise any desired material.

In operation, an actuator and/or the tension in the belt(s) 28 will act on the subframe 200 in order to move the subframe in between its rearward and forward positions. Accordingly, the follower roller(s) 210, attached to the subframe 200, will adjust a position of the belt(s) throughout formation of the bale. In the empty bale position, e.g. when the bale chamber 22 is empty, the tension in the belt(s) 28 will pull the subframe 200 rearwardly and downwardly so that the subframe 200 abuts up against the lower, rearward mechanical stop 220. Thereby, the rearward position of the follower rollers 210 will create a straight path to the nose roll and accordingly reduce interference between the belt(s) 28 and the rollers 24. During initial bale growth, the tension in the belt(s) will pull the subframe 200 forwardly and upwardly so that the subframe 200 abuts up against the upper, forward mechanical stop 222. Thereby, proper tangency between the belt(s) 28 and the bale will be maintained throughout formation of the bale, which accordingly minimizes and/or eliminates any gaps between the outer periphery of the bale and the belt(s) 28. Thus, during bale growth, the subframe 200 prevents crop material from escaping out of the bale chamber 22 through any gaps between the outer periphery of the bale and the belt(s) 28.

As used herein, the term "rearward position" may refer to the first position of the subframe 200 and/or follower roller(s) 210 when the bale chamber 22 is substantially empty (FIG. 2). Furthermore, the term "forward position" may refer to the second position of the subframe 200 and/or follower roller(s) 210 when the bale chamber 22 is substantially full (FIG. 3). It should be appreciated that the term "rearward position" may be synonymous with "lower position", and the term "forward position" may be synonymous with "upper position", given the pivoting nature of the subframe 200.

It is to be understood that the operation of the bale chamber 22 may be performed by the controller 34 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 34 described herein is implemented in software code or instructions which are tangibly stored on a tangible computer readable medium. The controller 34 loads the software code or instructions via a direct interface with the computer readable medium or via a wired and/or wireless network. Upon loading and executing such software code or instructions by the controller 34, the controller 34 may perform any of the functionality of the controller 34 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A bale chamber of an agricultural round baler, comprising:
   a main frame;
   a plurality of rollers supported by the main frame;
   at least one belt engaging with at least one roller of the plurality of rollers, and the at least one belt and the plurality of rollers are together configured for creating a round circulating chamber which expands in between an empty bale position and a full bale position for engaging and rolling a bale;
   a subframe movably connected to the main frame;
   at least one follower roller pivotally connected to the subframe at a first pivot axis, the at least one follower roller engaging with the at least one belt, and the subframe is configured for moving during formation of the bale so that the at least one follower roller moves in between a first position at the empty bale position of the circulating chamber and a second position at the full bale position of the circulating chamber, the subframe comprising a pair of mounting plates which are pivotally connected to the main frame, the mounting plates of the subframe each have a triangular cross-section with a top portion which is pivotally connected to the main frame at a second pivot axis and a base portion which pivotally mounts the at least one follower roller at the first pivot axis, the at least one follower roller comprises two follower rollers which are respectively pivotally connected to opposing ends of the base portion of each mounting plate of the subframe; and a first mechanical stop and a second mechanical stop configured for contacting and limiting a movement of the subframe, the first mechanical stop is located rearwardly of the subframe, and the second mechanical stop is located forwardly of the subframe, the first and second mechanical stops being adjustably mounted in indexed positions on the main frame.

2. The bale chamber of claim 1, wherein the subframe is pivotally connected to the main frame, and the first position of the at least one follower roller is a rearward position and the second position of the at least one follower roller is a forward position.

3. The bale chamber of claim 2, wherein the subframe is a free-floating subframe such that a tension of the at least one belt, during formation of the bale, controls and pivots the subframe, and the at least one follower roller will accordingly adjust a position of the at least one belt throughout formation of the bale.

4. An agricultural round baler, comprising:
a pickup unit configured for picking up a crop material from a field; and
a bale chamber configured for receiving the crop material from the pickup unit, comprising
  a main frame;
  a plurality of rollers supported by the main frame;
  at least one belt engaging with at least one roller of the plurality of rollers, and the at least one belt and the plurality of rollers are together configured for creating a round circulating chamber which expands in between an empty bale position and a full bale position for engaging and rolling a bale;
  a subframe movably connected to the main frame;
  at least one follower roller pivotally connected to the subframe at a first pivot axis, the at least one follower roller engaging with the at least one belt, and the subframe is configured for moving during formation of the bale so that the at least one follower roller moves in between a first position at the empty bale position of the circulating chamber and a second position at the full bale position of the circulating chamber, the subframe comprising a pair of mounting plates which are pivotally connected to the main frame, the mounting plates of the subframe each have a triangular cross-section with a top portion which is pivotally connected to the main frame at a second pivot axis and a base portion which pivotally mounts the at least one follower roller at the first pivot axis, the at least one follower roller comprises two follower rollers which are respectively pivotally connected to opposing ends of the base portion of each mounting plate of the subframe; and
  a first mechanical stop and a second mechanical stop configured for contacting and limiting a movement of the subframe, the first mechanical stop is located rearwardly of the subframe, and the second mechanical stop is located forwardly of the subframe, the first and second mechanical stops being adjustably mounted in indexed positions on the main frame.

5. The agricultural round baler of claim 4, wherein the subframe is pivotally connected to the main frame, and the first position of the at least one follower roller is a rearward position and the second position of the at least one follower roller is a forward position.

6. The agricultural round baler of claim 5, wherein the subframe is a free-floating subframe such that a tension of the at least one belt, during formation of the bale, controls and pivots the subframe, and the at least one follower roller will accordingly adjust a position of the at least one belt throughout formation of the bale.

7. A method of operating an agricultural round baler, comprising:
providing a bale chamber for the agricultural round baler, the bale chamber comprising a main frame, a plurality of rollers supported by the main frame, at least one belt engaging with at least one roller of the plurality of rollers, and the at least one belt and the plurality of rollers are together configured for creating a round circulating chamber which expands in between an empty bale position and a full bale position for engaging and rolling a bale, a subframe movably connected to the main frame, and at least one follower roller pivotally connected to the subframe at a first pivot axis, the at least one follower roller engaging with the at least one belt;
rolling the bale within the circulating chamber; and
moving the subframe during formation of the bale so that the at least one follower roller moves in between a first position at the empty bale position of the circulating chamber and a second position at the full bale position of the circulating chamber, the subframe comprising a pair of mounting plates which are pivotally connected to the main frame, the mounting plates of the subframe each have a triangular cross-section with a top portion which is pivotally connected to the main frame at a second pivot axis and a base portion which pivotally mounts the at least one follower roller at the first pivot axis, the at least one follower roller comprises two follower rollers which are respectively pivotally connected to opposing ends of the base portion of each mounting plate of the subframe, a first mechanical stop and a second mechanical stop configured for contacting and limiting a movement of the subframe, the first mechanical stop is located rearwardly of the subframe, and the second mechanical stop is located forwardly of the subframe, the first and second mechanical stops being adjustably mounted in indexed positions on the main frame.

8. The method of claim 7, wherein the subframe is pivotally connected to the main frame, wherein the subframe is pivotally connected to the main frame, the first position of the at least one follower roller is a rearward position and the second position of the at least one follower roller is a forward position, and the step of moving the subframe comprises pivoting the subframe so that the at least one follower roller pivots in between the rearward position and the forward position.

9. The method of claim 8, wherein the subframe is a free-floating subframe such that a tension of the at least one belt, during formation of the bale, controls and pivots the subframe, and the at least one follower roller will accordingly adjust a position of the at least one belt throughout formation of the bale.

\* \* \* \* \*